United States Patent [19]
Yoshida et al.

[11] 3,932,494
[45] Jan. 13, 1976

[54] THIOHUMIC ACID, A PROCESS FOR PREPARING SAME, AND ITS USE FOR ABSORBING HEAVY METAL IONS

[75] Inventors: Hisayoshi Yoshida; Takato Nakamura; Masanao Nakagawa; Seiji Arita; Toshiharu Miki, all of Tosu, Japan

[73] Assignee: Director-General of the Agency of Industrial Science and Technology, Tokyo, Japan

[22] Filed: Dec. 20, 1973

[21] Appl. No.: 426,561

[30] Foreign Application Priority Data
Dec. 21, 1972 Japan................... 47-128610

[52] U.S. Cl. ......... 260/502.6; 260/515 H; 252/184; 210/24
[51] Int. Cl.² ........................ C07C 153/00
[58] Field of Search............ 260/502.6, 515 H

[56] References Cited
UNITED STATES PATENTS
3,505,366   4/1970   Greco et al.............. 260/502.6

OTHER PUBLICATIONS
Fuchs et al., *Chem. Abstract*, 22, 583 (1928).
Cram et al., *Organic Chemistry*, pp. 253–254, 351–353, (1964).
Steelink, *J. Chem. Educ.*, 40, 379 (1963).

*Primary Examiner*—James O. Thomas, Jr.
*Assistant Examiner*—Nicky Chan
*Attorney, Agent, or Firm*—William J. Daniel

[57] ABSTRACT

The compound thiohumic acid resulting from replacing at least a part of the carboxyl groups in humic acid by thiocarboxyl groups, i.e.,

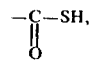

as well as a heavy metal adsorbent containing thiohumic acid as its active ingredient. This new compound is obtained by treating humic acid with a halogenating agent to form humic acid halide and treating such halide with a thiolating agent.

2 Claims, No Drawings

3,932,494

THIOHUMIC ACID, A PROCESS FOR PREPARING SAME, AND ITS USE FOR ABSORBING HEAVY METAL IONS

BACKGROUND OF THE INVENTION

This invention relates to a new compound, i.e., thiohumic acid, and to a heavy metal adsorbent containing this new compound as its active ingredient.

In recent years, pollution of rivers, lakes and sea water with heavy metal ions contained in industrial effluents has become a serious social problem and, consequently, the elimination of heavy metal ions in industrial effluents has become necessary for preventing environmental pollution. It has hitherto been proposed for removing heavy metal ions in water to precipitate these ions as sulfides, carbonates or hydroxides, adsorb them with active carbon, replace them with an ion exchange resin and complex them with a chelate-forming agent. However, such methods are unsuited for treating a large amount of liquids such as industrial effluents, as these methods require expensive treating agents and the rate of removal they achieve is limited.

It is known that humic acid exhibits high adsorptivity for various heavy metal ions, such as copper and cadmium ions. However, humic acid possesses poor adsorptivity for mercury ions and cannot be used as an adsorbent intended for removing mercury. In the chemical industry field, therefore, there is a great demand for the development of a new adsorbent which can economically be prepared and has a high adsorptivity for various heavy metal ions including mercury ions.

BRIEF SUMMARY OF THE INVENTION

It is a prime object of this invention to provide a new compound called thiohumic acid.

It is another object of this invention to provide a heavy metal adsorbent possessing a high adsorptivity for heavy metal ions, especially mercury ions.

It is still another object of this invention to provide a process for preparing thiohumic acid.

These and other objects of this invention will become more fully apparent as the description proceeds.

DETAILED DESCRIPTION OF THE INVENTION

As the result of much research conducted for modifying humic acid to prepare a heavy metal adsorbent possessing good adsorptivity for heavy metals such as mercury, it has now been found that a compound obtained by substituting at least a part of carboxyl groups of humic acid by thiocarboxyl groups can minimize the concentration of mercury to 0.001 ppm or less when used for the treatment of an aqueous solution containing inorganic and/or organic mercury compounds at a concentration of 1 ppm.

In accordance with this invention, humic acid is first heated together with a halogenating agent to convert the acid into humic acid halide and any remaining excess halogenating agent is removed by distillation or other suitable means. Next, the resulting humic acid halide is dissolved or suspended in a solvent such as dimethylformamide, pyridine, dimethylsulfoxide, ethanol or water and then reacted with a thiolating agent. The reaction product thus obtained is separated from the reaction liquid by filtration or centrifugal separation, washed with water and dried. Thiohumic acid thus obtained contains about 2–6 meq/g of thiocarboxyl group and exhibits high adsorptivity to mercury compounds.

As the humic acid utilizable in this invention as the starting material, there can be mentioned natural humic acid as well as the so-called humic acid homologues, for example, oxidized coal obtained by oxidizing coal with an oxidizing agent, such as nitric acid or oxygen, regenerated humic acid obtained by extracting natural humic acid or oxidized coal with a dilute aqueous solution of alkali and adding an acid such as hydrochloric acid to the extract, another oxidized coal obtained by oxidation of coke, semi-coke, pitch or asphalt, and regenerated humic acid homologues obtained by extraction with a diluted alkali of such oxidized coal. Lignite and brown coal abounding in humic acid can also be used directly as the starting material for this invention.

Reagents for converting the carboxyl group in humic acid to an acid halide group include, for example, thionyl chloride, thionyl bromide, phosphorus trichloride, phosphorus pentachloride and phosphorus oxychloride. Among these, thionyl chloride is most preferable because of its high reactivity and easiness in removal of any excess after the reaction and of by-products. After completion of the halogenation reaction for humic acid, any remaining excess halogenating agent is distilled and reused.

The reaction between humic acid and a halogenating agent takes place to a notable degree at room temperature, but is suitably carried out at the boiling point or at a temperature of 20°–30°C below the boiling temperature of the halogenating agent to attain the halogenation reaction completely. The reaction requires 0.5–5 hours. In view of the fact that the yield of the product becomes higher than the theoretical yield when the reaction time is prolonged, it is supposed that in addition to halogenation of the carboxyl groups, halogenation of other active hydrogen atoms in the humic acid also takes place.

As described above, humic acid halide is then reacted with a thiolating agent such as hydrogen sulfide or alkali metal hydrosulfide to introduce the thiol group into the humic acid molecule. Utilizable as the solvent for this reaction are, for example, dimethylformamide (DMF), pyridine, dimethylsulfoxide (DMSO), alcohols, water and mixtures thereof. It is noted that not only the carbonyl halide groups but also other active halogens, for example, chlorine atoms bonded to the aliphatic carbon atoms, are converted into thiol groups by this reaction.

The product of the invention obtained as described above contains 2–6 meq/g of thiocarboxyl groups according to the iodometry for the determination of thiol groups and possesses a strong, selective adsorptivity for heavy metal ions.

As one of the characteristic features of the heavy metal adsorbent of the humic acid series according to this invention, the adsorbent adsorbs mercury compounds selectively in a wide pH range and without deterioration in quality even in the presence of other metal ions. More precisely, the heavy metal adsorbent of this invention exhibits an excellent adsorptivity for mercury in liquids to be treated having pH values within the range of 2–10 or higher. The concurrent presence of a considerably high concentration of sodium and calcium ions and a small amount of metal ions such as iron, aluminum, chromium, copper and cadmium ions and anions such as chlorine ion gives no adverse influence on the adsorptivity of the present heavy metal adsorbent for mercury. Thiohumic acid is thus particularly effective for the adsorption of mercury but also has good adsorptivity for heavy metals other than mercury.

Another characteristic feature of thiohumic acid is its easy regeneration. The adsorbent after use can be regenerated by treating it with an aqueous solution of a mineral acid of low normality and can be used as regenerated.

Humic acid used as the starting material may be in the form of powder or granules. In case the adsorbent is used in a continuous treating method, such as in a column, the heavy metal adsorbent of humic acid series prepared from granular humic acid is suitable for this purpose.

This invention will be illustrated in more detail by way of the following examples.

EXAMPLE 1

20 Grams of regenerated humic acid, prepared by the oxidation of coal with nitric acid, were heated at 80°C for 3 hours together with 200 ml of thionyl chloride. After the reaction, unreacted thionyl chloride was almost entirely distilled off at 80°C under atmospheric pressure and then completely distilled off at 80°C under reduced pressure. The yield of the resulting humic acid chloride was 23.0 g. 5.0 Grams of humic acid chloride were then added to 100 ml of DMF and gaseous hydrogen sulfide was blown thereinto for 5 hours.

Then, water was added to the reaction liquid to precipitate thiohumic acid and the precipitate was collected by centrifugal separation, washed with water and dried. The yield of the thiohumic acid was 5.1 g and its thiocarboxyl content was 4.8 meq/g.

0.05 Gram of the recovered product was added to 100 ml each of an aqueous solution of 1 ppm methylmercuric chloride and an aqueous solution of 1 ppm mercuric chloride and each solution was shaken for 24 hours. Upon measuring the concentrations of methylmercuric chloride and mercuric chloride in the aqueous solutions, these concentrations were 0.0052 ppm and 0.0036 ppm, respectively.

In a similar adsorption test using 0.5 g of thiohumic acid, the concentrations of methylmercuric chloride and mercuric chloride in the treated aqueous solutions were both reduced to 0.001 ppm.

EXAMPLE 2

0.05 Gram of thiohumic acid prepared according to Example 1 was added to 100 ml each of 0.05 M aqueous solution of sodium chloride containing 1 ppm methylmercuric chloride and $1 \times 10^{-3}$ M aqueous solution of cupric chloride and each solution was shaken for 24 hours. Upon measuring the concentrations of methylmercuric chloride and cupric chloride in the aqueous solution, these concentrations were 0.0056 ppm and 0.0061 ppm, respectively.

EXAMPLE 3

1.0 Gram of humic acid chloride prepared according to Example 1 was added to each of 20 ml of pyridine and 20 ml of a 15% aqueous solution of potassium hydroxide. Hydrogen sulfide was blown into each solution for 4 hours. After completion of the reaction, thiohumic acid thus prepared was collected, by centrifugal separation from the aqueous reaction liquid, and directly from the pyridine medium, and after acification with hydrochloric acid in the case of the aqueous solution of potassium hydroxide was washed with water and dried. The yields of the products were 0.9 g and 1.1 g, respectively, and the thiocarboxyl group content was 3.8 meq/g and 3.1 meq/g, respectively.

0.1 Gram of each of the above products was added to separate 100 ml aqueous solutions containing 1 ppm methylmercuric chloride and each solution was shaken for 24 hours. Upon measuring the concentrations of methylmercuric chloride in the aqueous solutions, the concentrations were 0.0064 ppm and 0.0071 ppm, respectively.

EXAMPLE 4

Ten g of humic acid prepared by extraction of lignite with alkali were heated at 50°C for 4 hours together with 50 g of phosphorus trichloride. After completion of the reaction, unreacted excess phosphorus trichloride was removed by distillation first at 80°C and then at 100°C under reduced pressure. In 20 ml of 90% ethanol were dissolved 5 g of potassium hydroxide and gaseous hydrogen sulfide was blown into the solution for 4 hours. To this solution were added 2.0 g of the above reaction product and the mixture was reacted together for 4 hours at 5°–15°C. After the reaction, the reaction liquid was acidified with hydrochloric acid to precipitate thiohumic acid which was then collected by centrifugal separation, washed with water and dried. The yield of the product was 1.9 g and its thiocarboxyl group content was 3.3 meq/g.

0.1 Gram of the product was added to 100 ml of an aqueous solution containing 1 ppm methylmercuric chloride and the solution was shaken for 24 hours. Upon measuring the concentration of methylmercuric chloride in the aqueous solution, the concentration was 0.0058 ppm.

EXAMPLE 5

Using regenerated humic acid prepared by oxidation of coal tar pitch with air, thiohumic acid was prepared in a manner similar to that described in Example 1. The yield of the acid chloride from 20 g of the regenerated humic acid was 22.6 g and the yield of thiohumic acid from 5.0 g of the acid chloride was 4.9 g. The thiocarboxyl group content of the thiohumic acid was 4.4 meq/g.

0.5 Gram of the reaction product was added to 100 ml each of an aqueous solution of 1 ppm methylmercuric chloride and an aqueous solution of 1 ppm mercuric sulfate and each solution was shaken for 24 hours. Upon measuring the concentrations of methylmercuric chloride and mercuric sulfate in the aqueous solutions, both concentrations were less than 0.001 ppm.

EXAMPLE 6

20 Grams of granular oxidized coal, obtained by the oxidation of granular semi-coke (manufactured from coal; dry distillation: 550°C, 30 min,; granularity: 24 mesh) with nitric acid, were reacted with 100 ml of thionyl chloride at 60°C for 5 hours. After completion of the reaction, unreacted excess thionyl chloride was removed by distillation under reduced pressure. The yield of the product was 22.1 g. 5.0 Grams of this product were added to 50 ml of DMF and gaseous hydrogen sulfide was blown thereinto for 5 hours. The product was collected by filtration, washed with water and dried in vacuo at room temperature. The yield of granular thiohumic acid was 4.9 g and its thiocarboxyl group content was 2.1 meq/g.

1.0 Gram of the granular thiohumic acid was added to 100 ml each of an aqueous solution of 1 ppm methylmercuric chloride and an aqueous solution of 1 ppm mercuric chloride and each solution was shaken for 24 hours. Upon measuring the concentrations of methylmercuric chloride and mercuric chloride, both concentrations were less than 0.001 ppm.

The mercury adsorptivity of the granular thiohumic acid used in the foregoing adsorption tests was regenerated by treating the acid with 2-N hydrochloric acid.

What is claimed is:

1. A thiocarboxyl derivative of humic acid prepared by (1) reacting:
   a. regenerated humic acid prepared by the oxidation of coal with nitric acid,
   b. humic acid prepared by the extraction of lignite with alkali,
   c. regenerated humic acid prepared by the oxidation of coal tar pitch with air, or
   d. granular oxidized coal obtained by the oxidation of granular semi-coke with nitric acid, with a halogenating agent of the group consisting of thionyl chloride, thionyl bromide, phosphorus trichloride, phosphorus pentachloride and phosphorus oxychloride at a temperature ranging from room temperature to the boiling point of said halogenating agent; and (2) reacting the resultant acid halide with a thiolating agent of the group consisting of hydrogen sulfide or alkali metal hydrosulfide to produce the thiocarboxyl derivative containing about 2–6 meq/g of thiocarboxyl groups.

2. A thiocarboxyl derivative as in claim 1 wherein said acid halide from step (1) is reacted with said thiolating agent in the presence of a solvent selected from the group consisting of dimethylformamide, pyridine, dimethylsulfoxide, alcohol, water and mixtures thereof.

* * * * *